(12) United States Patent
Zhou et al.

(10) Patent No.: US 10,607,369 B2
(45) Date of Patent: Mar. 31, 2020

(54) METHOD AND DEVICE FOR INTERACTIVE CALIBRATION BASED ON 3D RECONSTRUCTION IN 3D SURVEILLANCE SYSTEM

(71) Applicant: Tsinghua University, Beijing (CN)

(72) Inventors: Jie Zhou, Beijing (CN); Lei Deng, Beijing (CN); Weiliang Lai, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 140 days.

(21) Appl. No.: 16/066,191

(22) PCT Filed: Dec. 30, 2016

(86) PCT No.: PCT/CN2016/113805
§ 371 (c)(1),
(2) Date: Jun. 26, 2018

(87) PCT Pub. No.: WO2017/114508
PCT Pub. Date: Jul. 6, 2017

(65) Prior Publication Data
US 2019/0221003 A1    Jul. 18, 2019

(30) Foreign Application Priority Data

Dec. 30, 2015    (CN) .......................... 2015 1 1024306

(51) Int. Cl.
*G06T 7/80* (2017.01)
*G06K 9/62* (2006.01)
(Continued)

(52) U.S. Cl.
CPC .............. *G06T 7/80* (2017.01); *G06F 16/901* (2019.01); *G06K 9/00771* (2013.01);
(Continued)

(58) Field of Classification Search
CPC .... G06T 7/80; G06T 7/75; G06T 7/55; G06T 5/002; G06T 3/4038; G06T 2207/30232;
(Continued)

(56) References Cited

U.S. PATENT DOCUMENTS 7,944,454 B2 *   5/2011   Zhou .................... H04N 7/181
                                                 345/629
9,305,401 B1 *   4/2016   Rudin ................... G06T 19/006
(Continued)

FOREIGN PATENT DOCUMENTS

CN    101398937    4/2009
CN    102103747    6/2011
(Continued)

OTHER PUBLICATIONS

WIPO, ISR for PCT/CN2016/113805, dated Mar. 30, 2017.
(Continued)

*Primary Examiner* — Juan A Torres
(74) *Attorney, Agent, or Firm* — Hodgson Russ LLP

(57) ABSTRACT

The present disclosure provides a method and a device for interactive calibration based on 3D reconstruction in a 3D surveillance system. The method includes: acquiring a reference background model and a surveillance video, capturing multiple scene images, and connecting multiple surveillance cameras corresponding to the surveillance video with each other, wherein at least one scene image of the multiple scene images has an overlapping portion with a site of the surveillance video; performing 3D reconstruction based on the multiple scene images to generate a 3D feature point cloud of the scene, and embedding the 3D feature point cloud into the reference background model; estimating an attitude of a current frame of the surveillance video, and automatically calibrating the surveillance camera; and calculating a homographic transformation from the attitude of
(Continued)

the current frame to the reference background model, and embedding an image projection into the reference background model.

18 Claims, 4 Drawing Sheets

(51) Int. Cl.
| | | |
|---|---|---|
| G06T 7/55 | (2017.01) | |
| G06K 9/00 | (2006.01) | |
| G06T 7/73 | (2017.01) | |
| G06F 16/901 | (2019.01) | |
| G06K 9/46 | (2006.01) | |
| G06T 3/40 | (2006.01) | |
| G06T 5/00 | (2006.01) | |

(52) U.S. Cl.
CPC .......... *G06K 9/4671* (2013.01); *G06K 9/6211* (2013.01); *G06T 3/4038* (2013.01); *G06T 5/002* (2013.01); *G06T 7/55* (2017.01); *G06T 7/75* (2017.01); *G06T 2207/10016* (2013.01); *G06T 2207/30232* (2013.01); *G06T 2207/30244* (2013.01)

(58) Field of Classification Search
CPC . G06T 2207/30244; G06T 2207/10016; G06T 2207/20108; G06K 9/00771; G06K 9/6211; G06K 9/4671; G06F 16/901
USPC .......................................................... 382/154
See application file for complete search history.

(56) References Cited

U.S. PATENT DOCUMENTS

| | | | | |
|---|---|---|---|---|
| 9,749,526 B2 * | 8/2017 | Chuang | ............ | G08B 13/19602 |
| 2006/0221072 A1 * | 10/2006 | Se | ............ | G01C 11/06 345/420 |
| 2012/0320162 A1 * | 12/2012 | Lo | ............ | G06T 7/564 348/47 |
| 2013/0070108 A1 * | 3/2013 | Aerts | ............ | F01D 21/003 348/187 |
| 2015/0371385 A1 * | 12/2015 | Zhou | ............ | G06T 7/80 382/201 |
| 2016/0140713 A1 * | 5/2016 | Martin | ............ | G06T 3/0006 382/154 |

FOREIGN PATENT DOCUMENTS

| | | |
|---|---|---|
| CN | 103198488 | 7/2013 |
| CN | 103400409 | 11/2013 |
| CN | 103646391 | 3/2014 |
| CN | 103824278 | 5/2014 |
| CN | 104050712 | 9/2014 |
| CN | 105678748 | 6/2016 |

OTHER PUBLICATIONS

SIPO, Office Action for CN Application No. 201511024306, dated Jan. 3, 2018.
WIPO, English translation of the ISR/WO for PCT/CN2016/113805, dated Mar. 30, 2017.
Cui et al., "Master-slave tracking algorithm using dual PTZ cameras based on ground plane constraint", Infrared and Laser Engineering, vol. 42, No. 8, Aug. 2013, pp. 2252-2261.
Zhang et al., "Multi-camera Target Tracking Research for Geographical Scene Collaboration", The Library of Science, No. 11, pp. A008-5, Nov. 15, 2014.

* cited by examiner

METHOD AND DEVICE FOR INTERACTIVE CALIBRATION BASED ON 3D RECONSTRUCTION IN 3D SURVEILLANCE SYSTEM

CROSS-REFERENCE TO RELATED APPLICATIONS

This application is a U.S. national phase application of International Application No. PCT/CN2016/113805, filed on Dec. 30, 2016, which claims a priority to Chinese Patent Application No. 201511024306.1, filed with the State Intellectual Property Office of P. R. China on Dec. 30, 2015, titled with "method and device for three-dimensional reconstruction-based interactive calibration in a three-dimensional surveillance system", and filed by TSINGHUA UNIVERSITY.

FIELD

The present disclosure relates to the technical field of computer vision and image processing, and more particularly to a method and a device for interactive calibration based on 3D reconstruction in a 3D surveillance system.

BACKGROUND

At present, 3D surveillance systems are a front research direction in intelligent surveillance systems. The 3D surveillance system embeds a large number of video pictures of surveillance devices into a unified reference background model in real time, integrates information of all surveillance pictures, to form overall cognition and free perspective observation of surveillance situation. Compared with 2D surveillance systems in the related art, monitoring personnel can quickly obtain exact locations and surveillance content of cameras and establish correspondence with scene environment without facing dozens of or even hundreds of surveillance screens. The 3D surveillance system can support high-level intelligent analysis of multi-camera collaboration, such as target detection and tracking, abnormal event detection, etc., and has broad prospects in fields such as intelligent transportation, intelligent security, intelligent communities, etc. In the process of establishing the 3D surveillance system, calibration of position and attitude of the camera in the 3D reference background model is a core link.

In the related art, for calibration problems, one method is based on sensors (such as GPS, inertial navigation, attitude sensors, etc.), which relies on special equipment and has low precision. The other method is automatic calibration method based on computer vision, which usually requires that there are enough overlapping fields between surveillance images, and calibrates relative poses between cameras by motion matching or feature matching. When the above calibration method is directly used to match a camera image and a reference background model image, it often fails due to a big difference between the two images or due to being lack of corresponding target motion information.

However, the 3D surveillance system in the related art mostly adopts an interactive calibration method, which establishes a correspondence relationship between each camera and the reference background model, and obtains the pose of the camera in combination with geometric calculation. However, this method has a large workload (e.g., proportional to the number of cameras) and is only suitable for static cameras, and cannot handle camera disturbances and Pan-Tilt-Zoom (PTZ) motion.

SUMMARY

The present disclosure aims to solve at least one of the above technical problems to at least some extent.

Embodiments of a first aspect of the present disclosure provide a method for interactive calibration based on 3D reconstruction in a 3D surveillance system. The method includes: acquiring a reference background model and a surveillance video, capturing multiple scene images, and connecting multiple surveillance cameras corresponding to the surveillance video with each other, wherein at least one scene image of the multiple scene images has an overlapping portion with a site of the surveillance video; performing 3D reconstruction based on the multiple scene images to generate a 3D feature point cloud of the scene, and embedding the 3D feature point cloud into the reference background model; estimating an attitude of a current frame of the surveillance video, and automatically calibrating the surveillance camera; and calculating a homographic transformation from the attitude of the current frame to the reference background model, and embedding an image projection into the reference background model.

Embodiments of a second aspect of the present disclosure provide a device for interactive calibration based on 3D reconstruction in a 3D surveillance system. The device includes: an acquiring module, configured to acquire a reference background model and a surveillance video; a capturing module, configured to capture multiple scene images, wherein at least one scene image of the multiple scene images has an overlapping portion with a site of the surveillance video; a connecting module, configured to connect multiple surveillance cameras corresponding to the surveillance video with each other; a generating module, configured to perform 3D reconstruction based on the multiple scene images to generate a 3D feature point cloud of the scene; an embedding module, configured to embed the 3D feature point cloud into the reference background model; an estimating module, configured to estimate an attitude of a current frame of the surveillance video, and automatically calibrate the surveillance camera; and a calculating module, configured to calculate a homographic transformation from the attitude of the current frame to the reference background model, and embed an image projection into the reference background model.

Embodiments of a third aspect of the present disclosure provide a storage medium, configured to store application program. The application program is configured to perform the method for interactive calibration based on 3D reconstruction in a 3D surveillance system according to embodiments of the first aspect of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
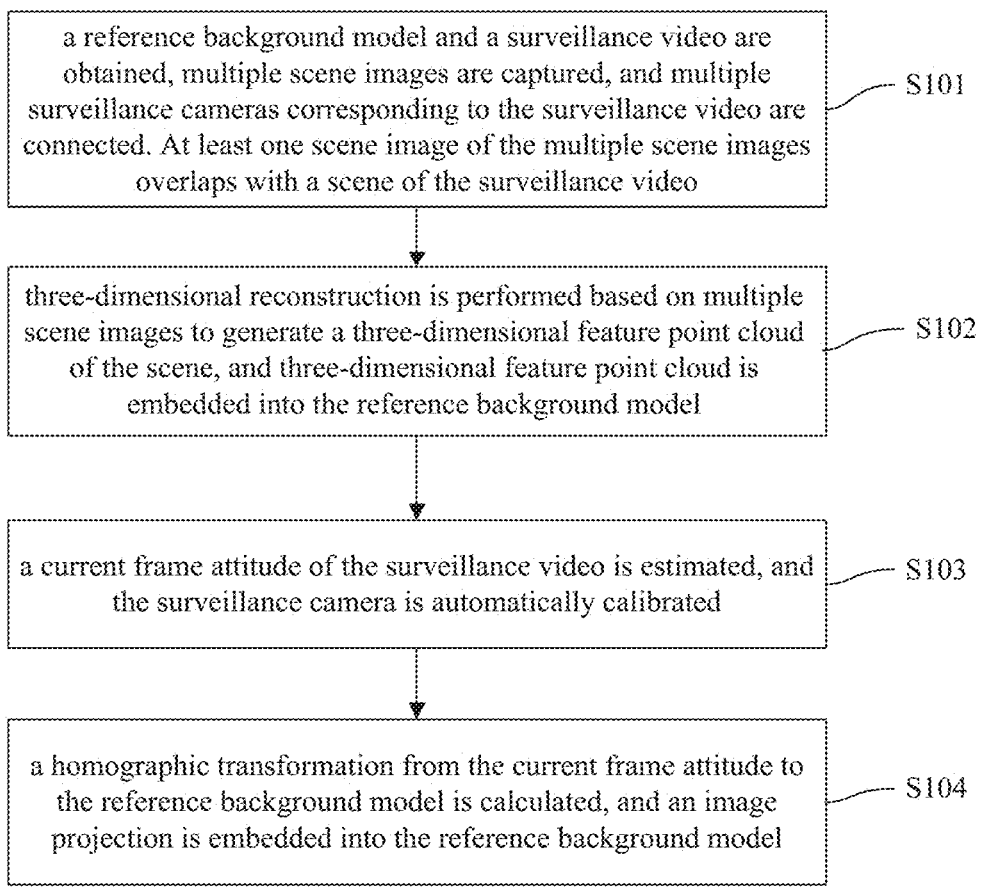
FIG. 1 is a flow chart of a method for interactive calibration based on 3D reconstruction in a 3D surveillance system according to an embodiment of the present disclosure.

Reference will be made in detail to embodiments of the present disclosure. Embodiments of the present disclosure will be illustrated in drawings, in which the same or similar elements and the elements having same or similar functions are denoted by like reference numerals throughout the descriptions. The embodiments described below with reference to the accompanying drawings are exemplary and are intended to explain the present disclosure, but should not be construed to limit the present disclosure.

A method and a device for interactive calibration based on 3D reconstruction in a 3D surveillance system according to embodiments of the present disclosure will be described below with reference to the accompanying drawings.

FIG. 1 is a flow chart of a method for interactive calibration based on 3D reconstruction in a 3D surveillance system according to an embodiment of the present disclosure. As illustrated in FIG. 1, the method for interactive calibration based on 3D reconstruction in a 3D surveillance system may include followings.

At block S101, a reference background model and a surveillance video are acquired, multiple scene images are captured, and multiple surveillance cameras corresponding to the surveillance video are connected with each other. At least one scene image of the multiple scene images has an overlapping portion with a site of the surveillance video.

In embodiments of the present disclosure, the reference background model may be a 3D model of a scene or a view of the 3D model of the scene. In detail, the reference background model may be a perspective of a satellite map or a 3D map.

In addition, in embodiments of the present disclosure, the acquisition device for capturing the surveillance video and the scene image may be a camera, a mobile phone, a PTZ lens, a panoramic acquisition device, or the like.

It can be understood that, at least some scene image has the overlapping portion with the site of the surveillance video, such that subsequent image positioning can be performed smoothly. In addition, in embodiments of the present disclosure, the term "multiple" should be understood in a broad sense, i.e., corresponding to a sufficient quantity.

At block S102, 3D reconstruction is performed based on multiple scene images to generate a 3D feature point cloud of the scene, and 3D feature point cloud is embedded into the reference background model.

In detail, a general Structure-From-Motion (SFM) method can be used for 3D reconstruction, to obtain the 3D feature point cloud of the scene and a camera matrix corresponding to each scene image. In detail, in embodiments of the present disclosure, corresponding Scale Invariant Feature Transform (SIFT) feature points can be extracted from the multiple scene images, and then image feature matching can be performed based on the SIFT feature points, and a fundamental matrix can be estimated based on a Random Sampling Consensus (RANSAC) framework, in which the fundamental matrix is used for denoising, and finally the 3D reconstruction on the fundamental matrix can be performed according to a general 3D reconstruction algorithm to obtain the 3D feature point cloud of the scene.

It can be understood that, in embodiments of the present disclosure, in the process of embedding the 3D feature point cloud into the reference background model, two problems needs to be solved. One problem is to estimate a geometric relationship between the 3D feature point cloud and the reference background model, such that a calibrated camera can be embedded into the reference background model. The other problem is to estimate a ground plane equation L of the scene, such that a visual area of a camera surveillance image projected onto the ground plane of the scene can be calculated.

Estimation of the geometric relationship may require inputted several corresponding points of the 3D feature point cloud and the reference background model, for example, at least four groups of corresponding points (for example, three groups for solving and one group for verifying) are required, and an optimum solution can be obtained in combination with a RANSAC robust estimation framework. The method of estimating of the ground plane L equation of the scene may estimate plane equations of 3D points in a point cloud coordinate system based on the RANSAC framework by inputting several 3D points (the number of 3D points may be greater than or equal to 3) belonging to the plane.

It should be noted that, in embodiments of the present disclosure, the above geometric relationship may denote that a view from a perspective of the reference background model is regarded as a virtual view camera in the feature point cloud coordinate system. To estimate the geometric relationship between the 3D feature point cloud and the reference background model is to obtain an attitude of the virtual view camera, which may include followings.

When the reference background model is a 2D view of a 3D model, the model may be an affine camera model or an infinity camera model, the objective is to obtain its projection matrix $P_\infty$, in which, the projection matrix only has 6 degrees of freedom. By giving several 3D→2D corresponding points between the 3D feature point cloud and the reference background view, all parameters of the projection matrix can be obtained based on a projection relationship, i.e., the 2D view of the 3D model can be understood as an image obtained by a camera by observing a 3D model, for example, the satellite map can be regarded as an image obtained by shooting a 3D building on surface of the earth by a camera on the satellite. The infinity camera model is used to eliminate perspective anaphora. When the reference background model is a 3D model, several 3D corresponding points between the 3D feature point cloud and the 3D background model are inputted, and a similarity transformation T from the 3D feature point cloud to the 3D background model is calculated.

In order to accelerate online image positioning, in addition, in an embodiment of the present disclosure, the method for interactive calibration may further include establishing an index tree for features of the 3D feature point cloud.

At block S103, an attitude of a current frame of the surveillance video is estimated, and the surveillance camera is automatically calibrated.

Figure 2:
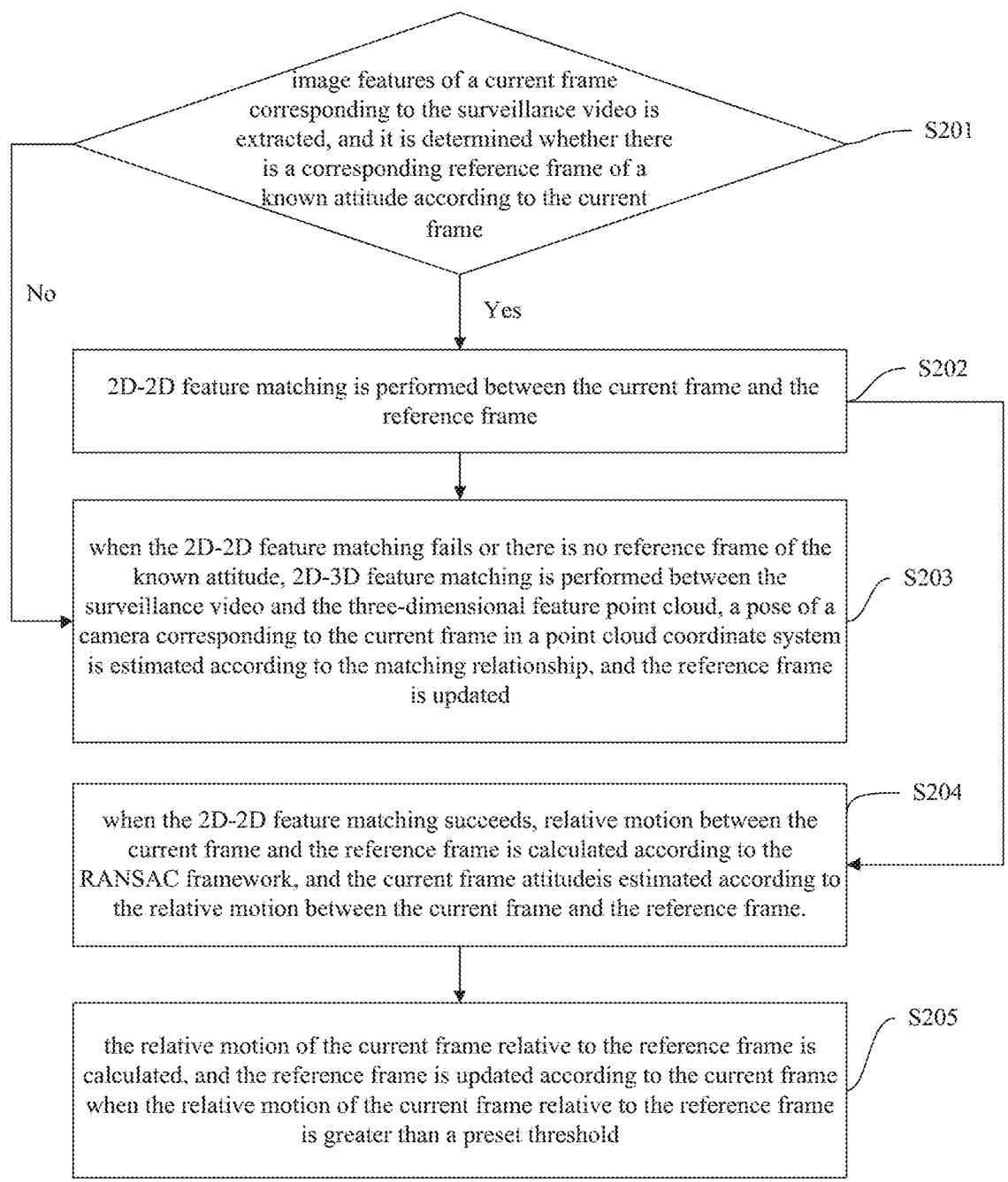
FIG. 2 is a flow chart of estimating an attitude of a current frame of a surveillance video according to an embodiment of the present disclosure.

In detail, in embodiments of the present disclosure, as illustrated in FIG. 2, the implementation process of estimating the attitude of the current frame of the surveillance video and automatically calibrating the surveillance camera may include followings.

At block S201, image features of the current frame corresponding to the surveillance video are extracted, and it is determined whether there is a corresponding reference frame of a known attitude according to the current frame.

At block S202, when there is the corresponding reference frame of the known attitude, 2D-2D feature matching between the current frame and the reference frame is performed.

At block S203, when the 2D-2D feature matching fails or there is no reference frame of the known attitude, 2D-3D feature matching between the surveillance video and the 3D feature point cloud is performed, a pose of a camera corresponding to the current frame in a point cloud coordinate system is estimated according to the matching relationship, and the reference frame is updated.

At block S204, when the 2D-2D feature matching succeeds, relative motion between the current frame and the reference frame is calculated according to the RANSAC framework, and the attitude $P_K$ of the current frame is estimated according to the relative motion between the current frame and the reference frame.

It should be noted that, in embodiments of the present disclosure, calculation of the relative motion is mainly considered from the following two situations. One is camera disturbance caused by natural factors (such as wind, collisions, etc.), which is approximated as pure rotation motion. The other one is motion of PTZ lens, which can be regarded as scaled rotation since the PTZ lens can rotate and zoom.

At block S205, the relative motion of the current frame relative to the reference frame is calculated, and the reference frame is updated according to the current frame when the relative motion of the current frame relative to the reference frame is greater than a preset threshold.

In other words, estimation of the attitude of the current frame of the surveillance video mainly includes two processes, i.e., 2D-3D image positioning and 2D-2D attitude transfer. The attitude of the current frame is generally a relative attitude, so a reference frame is needed. When there is the reference frame, the 2D-2D attitude transfer can be performed. The 2D-2D attitude transfer mainly includes feature extraction and matching, relative motion estimation and update of the reference frame. In embodiments of the present disclosure, in order to accelerate feature extraction, a SiftGPU method can be adopted, and the relative motion can be estimated by using the RANSAC framework. When there is no reference frame or the 2D-2D matching fails, 2D-3D image positioning can be performed, and the pose of the current image can be estimated by using a camera attribute estimation algorithm PnP (Perspective-n-Point). When the estimation of the attitude succeeds, the reference frame can be created based on the attitude.

At block S104, a homographic transformation from the attitude of the current frame to the reference background model is calculated, and an image projection is embedded into the reference background model.

Figure 3:
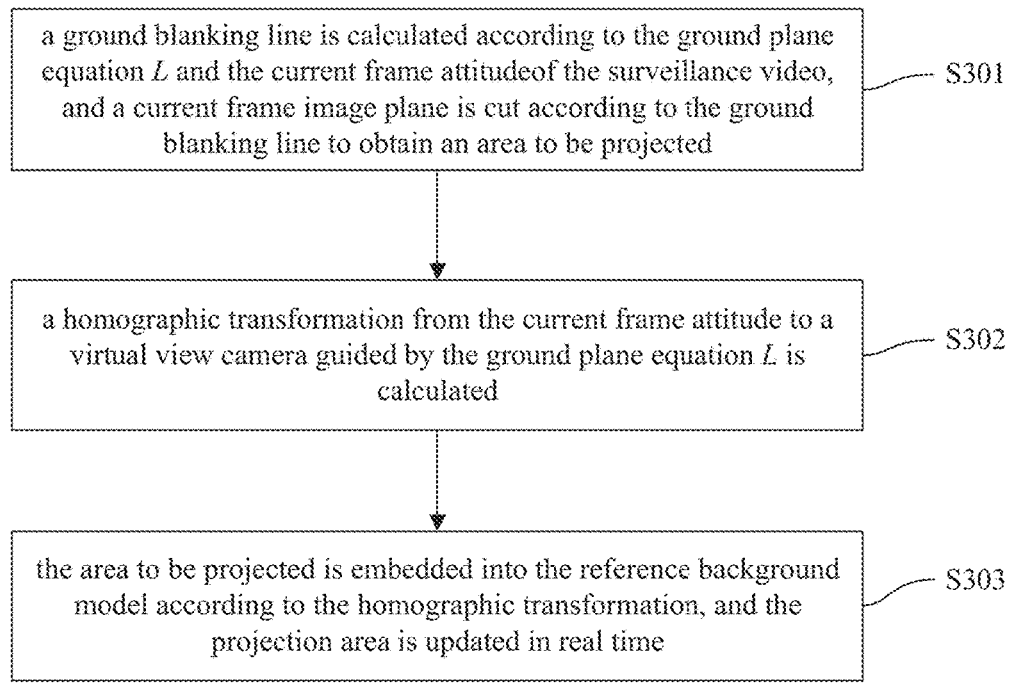
FIG. 3 is a flow chart of calculating a homographic transformation and embedding an image projection into a reference background model according to an embodiment of the present disclosure.

In detail, in embodiments of the present disclosure, as illustrated in FIG. 3, the implementation process of the above block S104 may include followings.

At block S301, a ground vanishing line is calculated according to the ground plane equation L and the attitude $P_K$ of the current frame of the surveillance video, and an image plane of the current frame is cut according to the ground vanishing line to obtain an area to be projected.

In embodiments of the present disclosure, the area to be projected can be understood as a lower half part of the ground vanishing line in the image of the current frame.

At block S302, the homographic transformation from the attitude $P_K$ of the current frame to a virtual view camera $P_\infty$ guided by the ground plane equation L is calculated.

At block S303, the area to be projected is embedded into the reference background model according to the homographic transformation, and the projection area is updated in real time.

It should be noted that, in embodiments of the present disclosure, the above blocks S101 and S102 may be offline analysis. In other words, according to the above blocks S101 and S102, the geometric transformation relationship between the 3D point cloud and the reference background model can be established in advance, and stored for subsequent use in online calibration phases. In addition, the above blocks S103 and S104 can be online analysis, i.e., each target camera can be automatically calibrated online based on the pre-established geometric transformation relationship between the 3D point cloud and the reference background model.

The method for interactive calibration according to embodiments of the present disclosure will further be described below with reference to FIG. 4.

Figure 4:
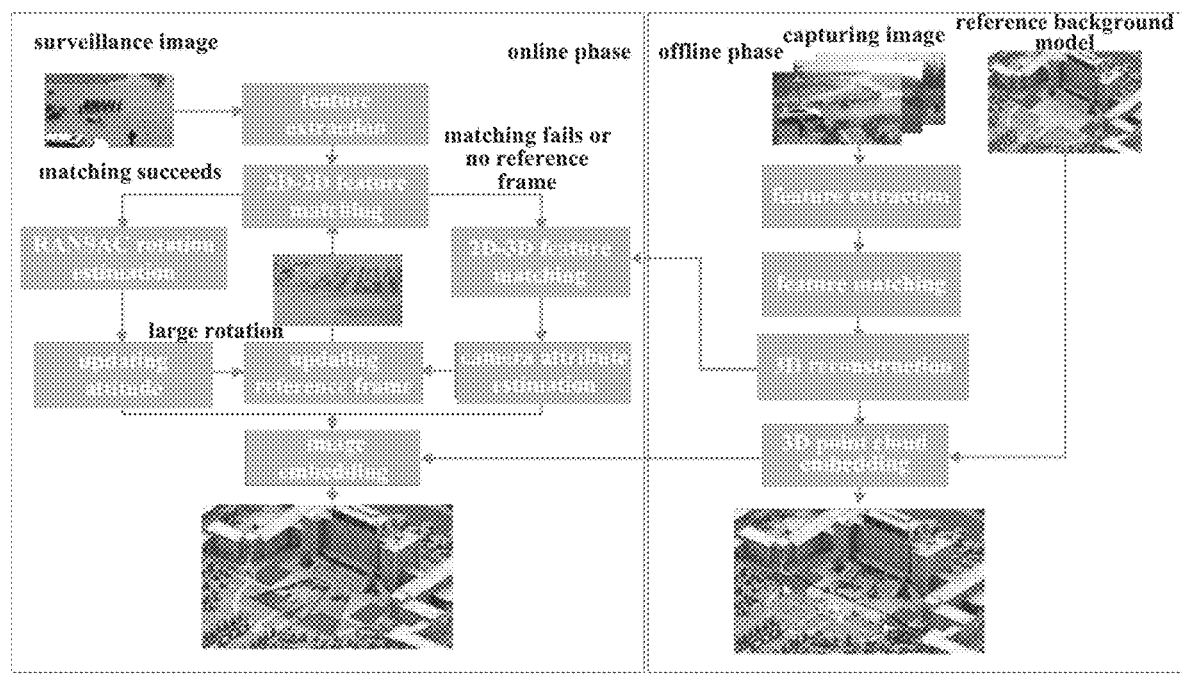
FIG. 4 is a schematic diagram of a method for interactive calibration based on 3D reconstruction in a 3D surveillance system according to an embodiment of the present disclosure.

For example, as illustrated in FIG. 4, the offline analysis can be performed first, i.e., the reference background model can be acquired first, and sufficient scene images can be captured, and then feature extraction on the scene image can be performed, the image feature matching can be performed according to the extracted feature points, and the fundamental matrix can be estimated according to the RANSAC framework. Then, the 3D reconstruction on the fundamental matrix can be performed according to the general 3D reconstruction algorithm to obtain the 3D feature point cloud of the scene, and then the 3D feature point cloud can be embedded into the reference background model, to continuously improve the reference background model.

Then, the online analysis can be performed. The surveillance video may be acquired, and feature extraction on the image of the current frame corresponding to the surveillance video may be performed, and then the 2D-2D feature matching between the current frame and the reference frame may be performed. When the matching fails or there is no reference frame, the 2D-3D feature matching between the surveillance video and the pre-generated 3D feature point cloud may be performed, the attribute of the camera can be estimated according to the matching relationship, and the reference frame may be updated according to an estimation result. When the 2D-2D feature matching succeeds, the relative motion between the current frame and the reference frame can be calculated according to the RANSAC framework, the attitude of the current frame can be estimated according to the relative motion, and the relative motion of the current frame relative to the reference frame can be calculated. When the relative motion is large enough (indicating that rotation of the camera is large in this case), the reference frame can be updated using the current frame. Finally, the homographic transformation from the attitude of the current frame to the reference background model can be calculated, and the image projection can be embedded into the reference background model to continuously improve the reference background model.

With the method for interactive calibration based on 3D reconstruction in a 3D surveillance system according to embodiments of the present disclosure, the poses of multiple cameras in the reference background model can be quickly and automatically estimated, and influence brought by image motion (such as disturbances or PTZ) can be overcome. Different from complex interactive methods for manually calibrating target cameras one by one in the related art, by introducing the 3D feature point cloud as an intermediate layer, the geometric transformation relationship between the 3D point cloud and the reference background model only needs to be established once, and then each target camera can be automatically calibrated based on the 3D point cloud, thus significantly reducing workload. In addition, in addition to static cameras, camera motion can also be automatically handled.

As described above, compared with methods for calibrating a camera pose in the related art, the present disclosure may have the following advantages. Only a small number (such as ≥4 groups) of 2D-3D corresponding points need to be manually calibrated, newly added cameras can essentially be calibrated automatically, and overall calibration can be performed on all images, such that workload is reduced.

In order to implement the above embodiments, the present disclosure also provides a device for interactive calibration based on 3D reconstruction in a 3D surveillance system.

Figure 5:
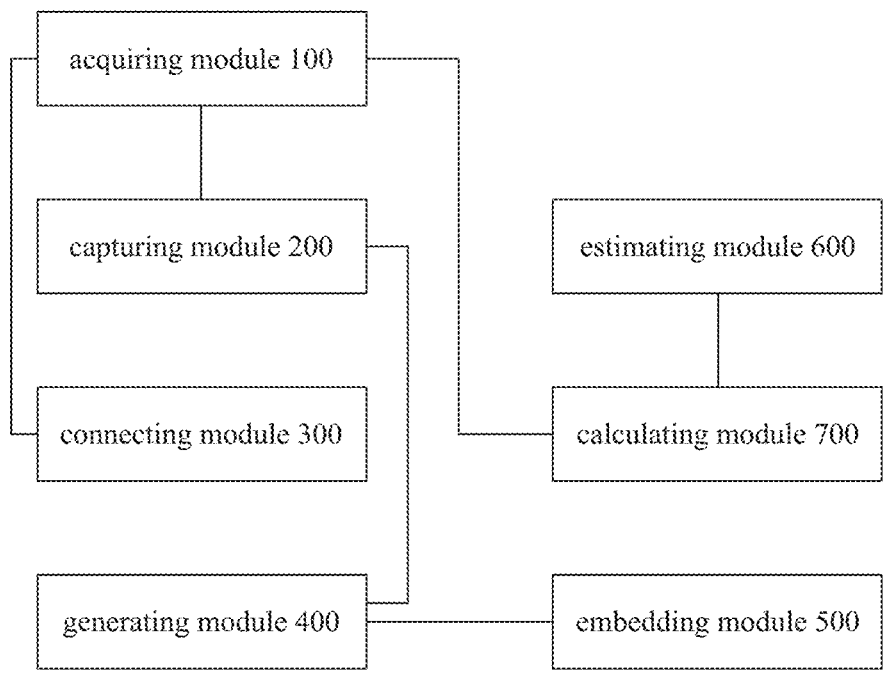
FIG. 5 is a block diagram of a device for interactive calibration based on 3D reconstruction in a 3D surveillance system according to an embodiment of the present disclosure.

FIG. 5 is a block diagram of a device for interactive calibration based on 3D reconstruction in a 3D surveillance system according to an embodiment of the present disclosure. As illustrated in FIG. 5, the device for interactive calibration may include an acquiring module 100, a capturing module 200, a connecting module 300, a generating module 400, an embedding module 500, an estimating module 600 and a calculating module 700.

In detail, the acquiring module 100 can be configured to acquire a reference background model and a surveillance video. In embodiments of the present disclosure, the reference background model may be a 3D model of a scene or a view of the 3D model of the scene. In detail, the reference background model may be a perspective of a satellite map or a 3D map.

The capturing module 200 can be configured to capture multiple scene images. At least one scene image of the multiple scene images has an overlapping portion with a site of the surveillance video. In embodiments of the present disclosure, the acquisition device for the acquiring module 100 to acquire the surveillance video and for the capturing module 200 to capture the scene images may be a camera, a mobile phone, a PTZ lens, a panoramic acquisition device, or the like.

It can be understood that, at least some scene image has the overlapping portion with the site of the surveillance video, such that subsequent image positioning can be performed smoothly. In addition, in embodiments of the present disclosure, the term "multiple" should be understood in a broad sense, i.e., corresponding to a sufficient quantity.

The connecting module 300 may be configured to connect multiple surveillance cameras corresponding to the surveillance video with each other.

The generating module 400 may be configured to perform 3D reconstruction based on the multiple scene images to generate a 3D feature point cloud of the scene. In detail, the generating module 400 may use a general SFM method for 3D reconstruction, to obtain the 3D feature point cloud of the scene and a camera matrix corresponding to each scene image. In detail, in embodiments of the present disclosure, the generating module 400 may extract corresponding SIFT feature points from the multiple scene images, and then perform image feature matching based on the SIFT feature points, and estimate a fundamental matrix based on a RANSAC framework, in which the fundamental matrix is used for denoising, and finally perform 3D reconstruction on the fundamental matrix according to a general 3D reconstruction algorithm to obtain the 3D feature point cloud of the scene.

In order to accelerate online image positioning, in addition, in an embodiment of the present disclosure, the generating module 400 may further be configured to establish an index tree for features of the 3D feature point cloud.

The embedding module 500 may be configured to embed the 3D feature point cloud into the reference background model. In detail, in embodiments of the present disclosure, the embedding module 500 may estimate a geometric relationship between the 3D feature point cloud and the reference background model, to embed a calibrated camera into the reference background model.

It can be understood that, in embodiments of the present disclosure, in a process of the embedding module 500 embedding the 3D feature point cloud into the reference background model, two problems needs to be solved. One problem is to estimate a geometric relationship between the 3D feature point cloud and the reference background model, such that a calibrated camera can be embedded into the reference background model. The other problem is to estimate a ground plane equation L of the scene, such that a visual area of a camera surveillance image projected onto the ground plane of the scene can be calculated.

Estimating the geometric relationship may require inputted several corresponding points of the 3D feature point cloud and the reference background model, for example, at least four groups of corresponding points (for example, three groups for solving and one group for verifying) are required, and an optimum solution is obtained in combination with a RANSAC robust estimation framework. The method of estimating of the ground plane L equation of the scene may estimate plane equations of 3D points in a point cloud coordinate system based on the RANSAC framework by inputting several 3D points (the number of 3D points may be greater than or equal to 3) belonging to the plane.

It should be noted that, in embodiments of the present disclosure, the above geometric relationship may denote that a view from a perspective of the reference background model is regarded as a virtual view camera in the feature point cloud coordinate system. To estimate the geometric relationship between the 3D feature point cloud and the reference background model is to obtain an attitude of the virtual view camera, which may include followings.

When the reference background model is a 2D view of a 3D model, the model may be an affine camera model or an infinity camera model, the objective is to obtain its projection matrix $P_\infty$, in which, the projection matrix only has 6 degrees of freedom. By giving several 3D→2D corresponding points between the 3D feature point cloud and the reference background view, all parameters of the projection matrix can be obtained based on a projection relationship, i.e., the 2D view of the 3D model can be understood as an image obtained by a camera by observing a 3D model, for example, the satellite map can be regarded as an image obtained by shooting a 3D building on surface of the earth by a camera on the satellite. The infinity camera model is used to eliminate perspective anaphora. When the reference background model is a 3D model, several 3D corresponding points between the 3D feature point cloud and the 3D background model are inputted, and a similarity transformation T from the 3D feature point cloud to the 3D background model is calculated.

The estimating module 600 may be configured to estimate an attitude of a current frame of the surveillance video, and automatically calibrate the surveillance camera. In detail, in embodiments of the present disclosure, the estimating module 600 may extract image features of the current frame corresponding to the surveillance video first, and determine whether there is a corresponding reference frame of a known attitude according to the current frame. When there is the corresponding reference frame of the known attitude, 2D-2D feature matching between the current frame and the reference frame is performed. When the 2D-2D feature matching fails or there is no reference frame of the known attitude, 2D-3D feature matching between the surveillance video and the 3D feature point cloud is performed, and a pose of a camera corresponding to the current frame in a point cloud coordinate system is estimated according to the matching relationship and the reference frame is updated. When the 2D-2D feature matching succeeds, relative motion between the current frame and the reference frame is calculated according to the RANSAC framework, the attitude $P_K$ of the current frame is estimated according to the relative motion between the current frame and the reference frame, the relative motion of the current frame relative to the reference frame is calculated, and the reference frame is updated according to the current frame when the relative motion of the current frame relative to the reference frame is greater than a preset threshold.

It should be noted that, in embodiments of the present disclosure, calculation of the relative motion is mainly considered from the following two situations. One is camera disturbance caused by natural factors (such as wind, collisions, etc.), which is approximated as pure rotation motion. The other one is motion of PTZ lens, which can be regarded as scaled rotation since the PTZ lens can rotate and zoom.

In other words, estimation of the attitude of the current frame of the surveillance video mainly includes two processes, i.e., 2D-3D image positioning and 2D-2D attitude transfer. The attitude of the current frame is generally a relative attitude, so a reference frame is needed. When there is the reference frame, the 2D-2D attitude transfer can be performed. The 2D-2D attitude transfer mainly includes feature extraction and matching, relative motion estimation and update of the reference frame. In embodiments of the present disclosure, in order to accelerate feature extraction, a SiftGPU method can be adopted, and the relative motion can be estimated by using the RANSAC framework. When there is no reference frame or the 2D-2D matching fails, 2D-3D image positioning can be performed, and the pose of the current image can be estimated by using a camera attribute estimation algorithm PnP (Perspective-n-Point). When the estimation of the attitude succeeds, the reference frame can be created based on the attitude.

The calculating module 700 may be configured to calculate a homographic transformation from the attitude of the current frame to the reference background model, and embed an image projection into the reference background model. In detail, in embodiments of the present disclosure, the calculating module 700 may first calculate a ground vanishing line according to the ground plane equation L and the attitude $P_K$ of the current frame of the surveillance video, and cut an image plane of the current frame according to the ground vanishing line to obtain an area to be projected. The area to be projected can be understood as a lower half part of the ground vanishing line in the image of the current frame. Then, the homographic transformation from the attitude $P_K$ of the current frame to a virtual view camera $P_\infty$ guided by the ground plane equation L is calculated, and finally the area to be projected is embedded into the reference background model according to the homographic transformation, and the projection area is updated in real time.

With the device for interactive calibration based on 3D reconstruction in a 3D surveillance system according to embodiments of the present disclosure, poses of multiple cameras in the reference background model can be quickly and automatically estimated, and effects brought by image motion (such as disturbances or PTZ) can be overcome. Different from complex interactive methods for manually calibrating target cameras one by one in the related art, by introducing the 3D feature point cloud as an intermediate layer, the geometric transformation relationship between the 3D point cloud and the reference background model only needs to be established once, and then each target camera can be automatically calibrated by using the 3D point cloud, thus significantly reducing workload. In addition, in addition to static cameras, camera motion can also be automatically handled.

In order to implement the above embodiments, embodiments of the present disclosure provide a storage medium, configured to store application program. The application program is configured to perform the method for interactive calibration based on 3D reconstruction in a 3D surveillance system according to any one of the above embodiments of the present disclosure.

In descriptions of the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. In the present specification, the appearances of the above terms are not necessarily referring to the same embodiment or example of the present disclosure. Furthermore, the particular features, structures, materials, or characteristics may be combined in any suitable manner in one or more embodiments or examples. In addition, under non-contradictory circumstances, various embodiments or examples as well as features of various embodiments or examples described in the present specification can be combined by those skilled in the art.

Any process or method described in a flow chart or other means may be understood as one or more modules, segments or portions including one or more executable instruction codes of the procedures configured to achieve a certain logic function or process, and the preferred embodiments of the present disclosure include other performances, in which the performance may be achieved in other orders instead of the order illustrated or discussed, such as in an almost simultaneous way or in an opposite order, which should be appreciated by those skilled in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It can be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium mentioned above may be read-only memories, magnetic disks, or optical disks. Although explanatory embodiments have been illustrated and described, it would be appreciated by those skilled in the art that the above embodiments cannot be construed to limit the present disclosure, and changes, alternatives, and modifications may be made in the embodiments without departing from spirit, principles and scope of the present disclosure.

What is claimed is:

1. A method for interactive calibration based on 3D reconstruction in a 3D surveillance system, comprising:
   acquiring a reference background model and a surveillance video, capturing multiple scene images, and connecting multiple surveillance cameras corresponding to the surveillance video with each other, wherein at least one scene image of the multiple scene images has an overlapping portion with a site of the surveillance video;
   performing 3D reconstruction based on the multiple scene images to generate a 3D feature point cloud of the scene, and embedding the 3D feature point cloud into the reference background model;
   estimating an attitude of a current frame of the surveillance video, and automatically calibrating the surveillance camera; and
   calculating a homographic transformation from the attitude of the current frame to the reference background model, and embedding an image projection into the reference background model.

2. The method according to claim 1, wherein performing the 3D reconstruction based on the multiple scene images to generate the 3D feature point cloud of the scene comprises:
   extracting corresponding Scale Invariant Feature Transform (SIFT) feature points from the multiple scene images;
   performing image feature matching based on the SIFT feature points, and estimating a fundamental matrix based on a Random Sampling Consensus (RANSAC) framework, wherein the fundamental matrix is used for denoising; and
   performing 3D reconstruction on the fundamental matrix according to a general 3D reconstruction algorithm, to obtain the 3D feature point cloud of the scene.

3. The method according to claim 1, wherein embedding the 3D feature point cloud into the reference background model comprises:
   estimating a geometric relationship between the 3D feature point cloud and the reference background model, to embed a calibrated camera into the reference background model.

4. The method according to claim 1, wherein estimating the attitude of the current frame of the surveillance video and automatically calibrating the surveillance camera comprises:
   extracting image features of the current frame corresponding to the surveillance video, and determining whether there is a corresponding reference frame of a known attitude according to the current frame;
   when there is the corresponding reference frame of the known attitude, performing 2D-2D feature matching between the current frame and the reference frame;
   when the 2D-2D feature matching fails or there is no reference frame of the known attitude, performing 2D-3D feature matching between the surveillance video and the 3D feature point cloud, estimating a pose of a camera corresponding to the current frame in a point cloud coordinate system according to the matching relationship, and updating the reference frame;
   when the 2D-2D feature matching succeeds, calculating relative motion between the current frame and the reference frame according to the RANSAC framework, and estimating the attitude $P_K$ of the current frame according to the relative motion between the current frame and the reference frame; and
   calculating the relative motion of the current frame relative to the reference frame, and updating the reference frame according to the current frame when the relative motion of the current frame relative to the reference frame is greater than a preset threshold.

5. The method according to claim 2, further comprising:
   establishing an index tree for features of the 3D feature point cloud; and
   estimating a ground plane equation L of the scene, to calculate a visual area of a camera surveillance image projected onto the ground plane of the scene.

6. The method according to claim 5, wherein calculating the homographic transformation from the attitude of the current frame to the reference background model, and embedding an image projection into the reference background model comprises:
  calculating a ground vanishing line according to the ground plane equation L and the attitude $P_K$ of the current frame of the surveillance video, and cutting an image plane of the current frame according to the ground vanishing line to obtain an area to be projected;
  calculating the homographic transformation from the attitude $P_K$ of the current frame to a virtual view camera $P_\infty$ guided by the ground plane equation L; and
  embedding the area to be projected into the reference background model according to the homographic transformation, and updating the projection area in real time.

7. A device for interactive calibration based on 3D reconstruction in a 3D surveillance system, comprising:
  a processor; and
  a memory, configured to store one or more software modules executable by the processor;
  wherein the one or more software modules comprise:
    an acquiring module, configured to acquire a reference background model and a surveillance video;
    a capturing module, configured to capture multiple scene images, wherein at least one scene image of the multiple scene images has an overlapping portion with a site of the surveillance video;
    a connecting module, configured to connect multiple surveillance cameras corresponding to the surveillance video with each other;
    a generating module, configured to perform 3D reconstruction based on the multiple scene images to generate a 3D feature point cloud of the scene;
    an embedding module, configured to embed the 3D feature point cloud into the reference background model;
    an estimating module, configured to estimate an attitude of a current frame of the surveillance video, and automatically calibrate the surveillance camera; and
    a calculating module, configured to calculate a homographic transformation from the attitude of the current frame to the reference background model, and embed an image projection into the reference background model.

8. The device according to claim 7, wherein the generating module is configured to:
  extract corresponding Scale Invariant Feature Transform (SIFT) feature points from the multiple scene images;
  perform image feature matching based on the SIFT feature points, and estimate a fundamental matrix based on a Random Sampling Consensus (RANSAC) framework, wherein the fundamental matrix is used for denoising; and
  perform 3D reconstruction on the fundamental matrix according to a general 3D reconstruction algorithm, to obtain the 3D feature point cloud of the scene.

9. The device according to claim 7, wherein the embedding module is configured to:
  estimate a geometric relationship between the 3D feature point cloud and the reference background model, to embed a calibrated camera into the reference background model.

10. The device according to claim 7, wherein the estimating module is configured to:
  extract image features of the current frame corresponding to the surveillance video, and determine whether there is a corresponding reference frame of a known attitude according to the current frame;
  when there is the corresponding reference frame of the known attitude, perform 2D-2D feature matching between the current frame and the reference frame;
  when the 2D-2D feature matching fails or there is no reference frame of the known attitude, perform 2D-3D feature matching between the surveillance video and the 3D feature point cloud, estimate a pose of a camera corresponding to the current frame in a point cloud coordinate system according to the matching relationship, and update the reference frame;
  when the 2D-2D feature matching succeeds, calculate relative motion between the current frame and the reference frame according to the RANSAC framework, and estimate the attitude $P_K$ of the current frame according to the relative motion between the current frame and the reference frame; and
  calculate the relative motion of the current frame relative to the reference frame, and update the reference frame according to the current frame when the relative motion of the current frame relative to the reference frame is greater than a preset threshold.

11. The device according to claim 8, wherein the generating module is configured to:
  establish an index tree for features of the 3D feature point cloud; and
  estimate a ground plane equation L of the scene, to calculate a visual area of a camera surveillance image projected onto the ground plane of the scene.

12. The device according to claim 11, wherein the calculating module is configured to:
  calculate a ground vanishing line according to the ground plane equation L and the attitude $P_K$ of the current frame of the surveillance video, and cut an image plane of the current frame according to the ground vanishing line to obtain an area to be projected;
  calculate the homographic transformation from the attitude $P_K$ of the current frame to a virtual view camera $P_\infty$ guided by the ground plane equation L;
  embed the area to be projected into the reference background model according to the homographic transformation, and updating the projection area in real time.

13. A non-transitory storage medium, configured to store application program, wherein the application program is configured to perform a method for interactive calibration based on 3D reconstruction in a 3D surveillance system, the method comprising:
  acquiring a reference background model and a surveillance video, capturing multiple scene images, and connecting multiple surveillance cameras corresponding to the surveillance video with each other, wherein at least one scene image of the multiple scene images has an overlapping portion with a site of the surveillance video;
  performing 3D reconstruction based on the multiple scene images to generate a 3D feature point cloud of the scene, and embedding the 3D feature point cloud into the reference background model;
  estimating an attitude of a current frame of the surveillance video, and automatically calibrating the surveillance camera; and
  calculating a homographic transformation from the attitude of the current frame to the reference background model, and embedding an image projection into the reference background model.

14. The non-transitory storage medium according to claim 13, wherein performing the 3D reconstruction based on the multiple scene images to generate the 3D feature point cloud of the scene comprises:
- extracting corresponding Scale Invariant Feature Transform (SIFT) feature points from the multiple scene images;
- performing image feature matching based on the SIFT feature points, and estimating a fundamental matrix based on a Random Sampling Consensus (RANSAC) framework, wherein the fundamental matrix is used for denoising; and
- performing 3D reconstruction on the fundamental matrix according to a general 3D reconstruction algorithm, to obtain the 3D feature point cloud of the scene.

15. The non-transitory storage medium according to claim 13, wherein embedding the 3D feature point cloud into the reference background model comprises:
- estimating a geometric relationship between the 3D feature point cloud and the reference background model, to embed a calibrated camera into the reference background model.

16. The non-transitory storage medium according to claim 13, wherein estimating the attitude of the current frame of the surveillance video and automatically calibrating the surveillance camera comprises:
- extracting image features of the current frame corresponding to the surveillance video, and determining whether there is a corresponding reference frame of a known attitude according to the current frame;
- when there is the corresponding reference frame of the known attitude, performing 2D-2D feature matching between the current frame and the reference frame;
- when the 2D-2D feature matching fails or there is no reference frame of the known attitude, performing 2D-3D feature matching between the surveillance video and the 3D feature point cloud, estimating a pose of a camera corresponding to the current frame in a point cloud coordinate system according to the matching relationship, and updating the reference frame;
- when the 2D-2D feature matching succeeds, calculating relative motion between the current frame and the reference frame according to the RANSAC framework, and estimating the attitude $P_K$ of the current frame according to the relative motion between the current frame and the reference frame; and
- calculating the relative motion of the current frame relative to the reference frame, and updating the reference frame according to the current frame when the relative motion of the current frame relative to the reference frame is greater than a preset threshold.

17. The non-transitory storage medium according to claim 14, wherein the method further comprises:
- establishing an index tree for features of the 3D feature point cloud; and
- estimating a ground plane equation L of the scene, to calculate a visual area of a camera surveillance image projected onto the ground plane of the scene.

18. The non-transitory storage medium according to claim 17, wherein calculating the homographic transformation from the attitude of the current frame to the reference background model, and embedding an image projection into the reference background model comprises:
- calculating a ground vanishing line according to the ground plane equation L and the attitude $P_K$ of the current frame of the surveillance video, and cutting an image plane of the current frame according to the ground vanishing line to obtain an area to be projected;
- calculating the homographic transformation from the attitude $P_K$ of the current frame to a virtual view camera $P_\infty$ guided by the ground plane equation L; and
- embedding the area to be projected into the reference background model according to the homographic transformation, and updating the projection area in real time.

* * * * *